US010812381B2

(12) United States Patent
Biancaniello (10) Patent No.: US 10,812,381 B2
(45) Date of Patent: *Oct. 20, 2020

(54) SYSTEMS AND METHODS FOR DIRECTLY RESPONDING TO DISTRIBUTED NETWORK TRAFFIC

(71) Applicant: Oath Inc., Dulles, VA (US)

(72) Inventor: Michael P. Biancaniello, Haymarket, VA (US)

(73) Assignee: Oath Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,428

(22) Filed: Nov. 15, 2019

(65) Prior Publication Data

US 2020/0084149 A1 Mar. 12, 2020

Related U.S. Application Data

(63) Continuation of application No. 14/483,317, filed on Sep. 11, 2014, now Pat. No. 10,516,608.

(51) Int. Cl.
*H04L 12/741* (2013.01)
*H04L 29/08* (2006.01)
*H04L 29/12* (2006.01)
*H04L 29/06* (2006.01)

(52) U.S. Cl.
CPC .............. *H04L 45/74* (2013.01); *H04L 61/10* (2013.01); *H04L 67/10* (2013.01); *H04L 67/1002* (2013.01); *H04L 67/42* (2013.01)

(58) Field of Classification Search
CPC ...... H04L 61/00–1558; H04L 67/00–42; H04L 45/00–74
See application file for complete search history.

(56) References Cited

U.S. PATENT DOCUMENTS

| 7,739,398 B1 | 6/2010 | Shabtay |
| 9,258,223 B1* | 2/2016 | Padiyar .................. H04L 45/74 |
| 2006/0077951 A1 | 4/2006 | Godas |
| 2006/0092976 A1* | 5/2006 | Lakshman .............. H04L 45/60 370/469 |

(Continued)

OTHER PUBLICATIONS

Schaumann, L3DSR—Overcoming layer 2 limitations of direct server return load balancing, 2011, Yahoo, pp. 1-33 (Year: 2011).*

(Continued)

*Primary Examiner* — Clayton R Williams
(74) *Attorney, Agent, or Firm* — Bookoff McAndrews, PLLC (57) ABSTRACT

Systems and methods are disclosed for directly responding to distributed network traffic received from a plurality of client devices. One method includes receiving, at a source device, client requests including a packet having a reserved portion, a source portion, and a destination portion; determining, for each client request, a target device from a plurality of target devices to respond to the client request; modifying, for each client request by the source device, the destination portion of the packet to an address of target device; modifying, for each client request by a switching layer prior to the target device receiving the modified client request, the destination portion; and responding directly to each client request by the target device without traversing the source device.

20 Claims, 6 Drawing Sheets

(56) References Cited

U.S. PATENT DOCUMENTS

| | | |
|---|---|---|
| 2008/0022000 A1 | 1/2008 | Furuya et al. |
| 2011/0225231 A1 | 9/2011 | Bansal et al. |
| 2013/0125120 A1 | 5/2013 | Zhang et al. |
| 2013/0166775 A1 | 6/2013 | Yang et al. |
| 2014/0269513 A1 | 9/2014 | Yu et al. |
| 2014/0280834 A1 | 9/2014 | Medved et al. |
| 2014/0280893 A1* | 9/2014 | Pfeifer .................. H04L 43/08 709/224 |
| 2015/0312092 A1* | 10/2015 | Golshan .............. H04L 41/0803 709/225 |
| 2016/0112731 A1* | 4/2016 | Tsukagoshi ........... H04L 65/608 725/109 |

OTHER PUBLICATIONS

Supermicro, L2/L3 Switches Link Layer Discovery Protocol (LLDP) Configuration Guide, 2013, pp. 1-23 (Year: 2013).*

* cited by examiner

SYSTEMS AND METHODS FOR DIRECTLY RESPONDING TO DISTRIBUTED NETWORK TRAFFIC

CROSS-REFERENCE TO RELATED APPLICATIONS

This application is a continuation of and claims the benefit of priority to pending U.S. application Ser. No. 14/483,317, filed Sep. 11, 2014, which is incorporated herein by reference in its entirety.

TECHNICAL FIELD

The present disclosure relates generally to managing resource usage and workload allocation across a distributed computing system, and particularly to improving the management and distribution of workloads across multiple computing resources within a distributed computing system that uses load balancing and direct server return.

BACKGROUND

Advancements in computing and network technologies now allow users to access different types of online content and services from almost any geographic location through a web browser or other client application installed at their respective computing devices. For example, a web service may be provided to user devices over the Internet by multiple computing devices operating within a data center or distributed computing system. Such computing devices may include, but are not limited to, servers, storage devices, routers, gateways, and other types of networked computing devices, which may be distributed across a local or wide area network associated with a particular service provider.

A distributed computing system often encounters performance bottlenecks and scalability problems that may prevent the system from effectively controlling resource usage by managing workloads distributed across multiple computing devices within the system. A distributed computing system may employ a hardware or software load balancer and/or an application delivery controller ("ADC") to monitor system resources and manage workloads distributed across the various computing devices within the system. For example, such a load balancer may be used to receive incoming requests from different clients or end users of a web service and distribute multiple data packets related to the received requests for processing by different back-end servers within the system. Further, the load balancer may be used to determine the load state of each remote back-end server device used to process data packets based on measurements of resource usage at that particular server, and may distribute traffic between the servers based on how busy each server is.

One useful technique for load balancing or distributing involves a technology referred to as software defined networking ("SDN"). Software defined networking is an approach that allows network administrators to manage network services through abstraction of lower level functionality, such as by decoupling the system that makes traffic control decisions (e.g., the "control plane") from the underlying systems that forward traffic to the selected destination (e.g., the "data plane"). One mechanism for enabling software defined networking is the Open Flow protocol, which is promoted by the Open Networking Foundation. OpenFlow is a communications protocol that gives access to the forwarding plane of a network switch or router over the network. In other words, OpenFlow allows the path of network packets through the network of switches to be determined programmatically by software using various fields in a data packet header or even arbitrary criteria. The separation of the control from the forwarding allows for more sophisticated traffic management than is feasible using access control lists ("ACLs") and forwarding protocols. The basic function of OpenFlow is to give external software direct access to program a switch's forwarding table.

Conventional load balancers and/or ADCs may use specialized hardware, which may increase costs. To avoid expensive purchases and increase capacity of a system using load balancers, Direct Server Return ("DSR") optimization may be used to reduce the traffic through the load balancer. However, use of DSR optimization is often limited to layer-2 domains to preserve the layer-3 header information. Further, DSR does not allow a load balancer to detect when a connection from a client is closed, and DSR does not allow for port address translations.

SUMMARY OF THE DISCLOSURE

Embodiments disclose systems and methods for directly responding to distributed network traffic received from a plurality of client devices.

According to certain embodiments, computer-implemented methods are disclosed for directly responding to distributed network traffic received from a plurality of client devices. One method includes receiving, at a source device, client requests from a plurality of client devices, each client request including a packet having a reserved portion, a source portion set to an address of the respective client device, and a destination portion set to an address of the source device; determining, for each client request, a target device from a plurality of target devices to respond to the client request; modifying, for each client request by the source device, the destination portion of the packet to an address of target device determined to respond to the client request and the reserve portion to indicate the address of the source device; transmitting, by the source device, the modified client request to the determined target device; modifying, for each client request by a switching layer prior to the target device receiving the modified client request, the destination portion of the packet to the address of source device based on the reserve portion; and responding directly to each client request by the target device without traversing the source device, each response including a packet having a source portion set to the address of the source device and a destination portion set to the address of the respective client device.

According to certain embodiments, systems are disclosed for directly responding to distributed network traffic received from a plurality of client devices. One system includes a data storage device storing instructions for directly responding to distributed network traffic received from a plurality of client devices; and a processor configured to execute the instructions to perform a method including: receiving, at a source device, client requests from a plurality of client devices, each client request including a packet having a reserved portion, a source portion set to an address of the respective client device, and a destination portion set to an address of the source device; determining, for each client request, a target device from a plurality of target devices to respond to the client request; modifying, for each client request by the source device, the destination portion of the packet to an address of target device determined to respond to the client request and the reserve portion to indicate the address of the source device; transmitting, by the source device, the modified client request to the determined target device; modifying, for each client request by a switching layer prior to the target device receiving the modified client request, the destination portion of the packet to the address of source device based on the reserve portion; and responding directly to each client request by the target device without traversing the source device, each response including a packet having a source portion set to the address of the source device and a destination portion set to the address of the respective client device.

According to certain embodiments, a non-transitory computer readable medium is disclosed that stores instructions that, when executed by a computer, cause the computer to perform a method of receiving, at a source device, client requests from a plurality of client devices, each client request including a packet having a reserved portion, a source portion set to an address of the respective client device, and a destination portion set to an address of the source device; determining, for each client request, a target device from a plurality of target devices to respond to the client request; modifying, for each client request by the source device, the destination portion of the packet to an address of target device determined to respond to the client request and the reserve portion to indicate the address of the source device; transmitting, by the source device, the modified client request to the determined target device; modifying, for each client request by a switching layer prior to the target device receiving the modified client request, the destination portion of the packet to the address of source device based on the reserve portion; and responding directly to each client request by the target device without traversing the source device, each response including a packet having a source portion set to the address of the source device and a destination portion set to the address of the respective client device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The present disclosure is directed to overcoming one or more of the above referenced issues. Specifically, the present disclosure is directed to managing the distribution of workloads across multiple resources in a distributed computing system utilizing direct server return ("DSR"). In an example, the resources within such a distributed computing system may include a plurality of target devices that are used to process tasks or job requests initiated by a client of an application or service provided by the distributed computing system. The distributed computing system may also include one or more source devices (or "sources") for distributing workloads and managing resource usage across the various target devices (or "targets") within the system. The target devices may include, for example, different back-end servers of a data center or clustered computing system, and the source devices may be one or more load balancers within the system. However, it should be noted that target devices and source devices are not limited thereto and may include other types of computing resources within the system including, for example, databases or other data storage devices.

As will be described in further detail below, each source device or load balancer within a data center or distributed computing system may be configured to monitor and control a data traffic flow to each target device. The monitored data traffic flow may be used to determine whether a target's load state remains healthy, i.e., the target does not have any or significant resource constraints while operating under its current workload. A target's load state may be determined using performance measurements calculated based on various metrics obtained by monitoring the data traffic flow to the target.

In one embodiment, a load balancer may receive a connection request from a client device having a source Internet Protocol ("IP") address and a destination IP address of the load balancer. The load balancer may analyze the connection request to determine a target device to handle the connection request. In order to improve performance, some distributed computing systems may be configured to include a plurality of load balancers. In such distributed computing systems, the load balancers' functions may be divided among the plurality of load balancers.

In order to improve response time to the request from the client device, the target device that receives the request may directly transmit a response to the client device without transmitting the response to the client device via the source device. In order to use direct responses to the client devices, the IP addresses of the connections may be modified to ensure that client devices correctly identify the responses to its request.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

It should also be appreciated that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
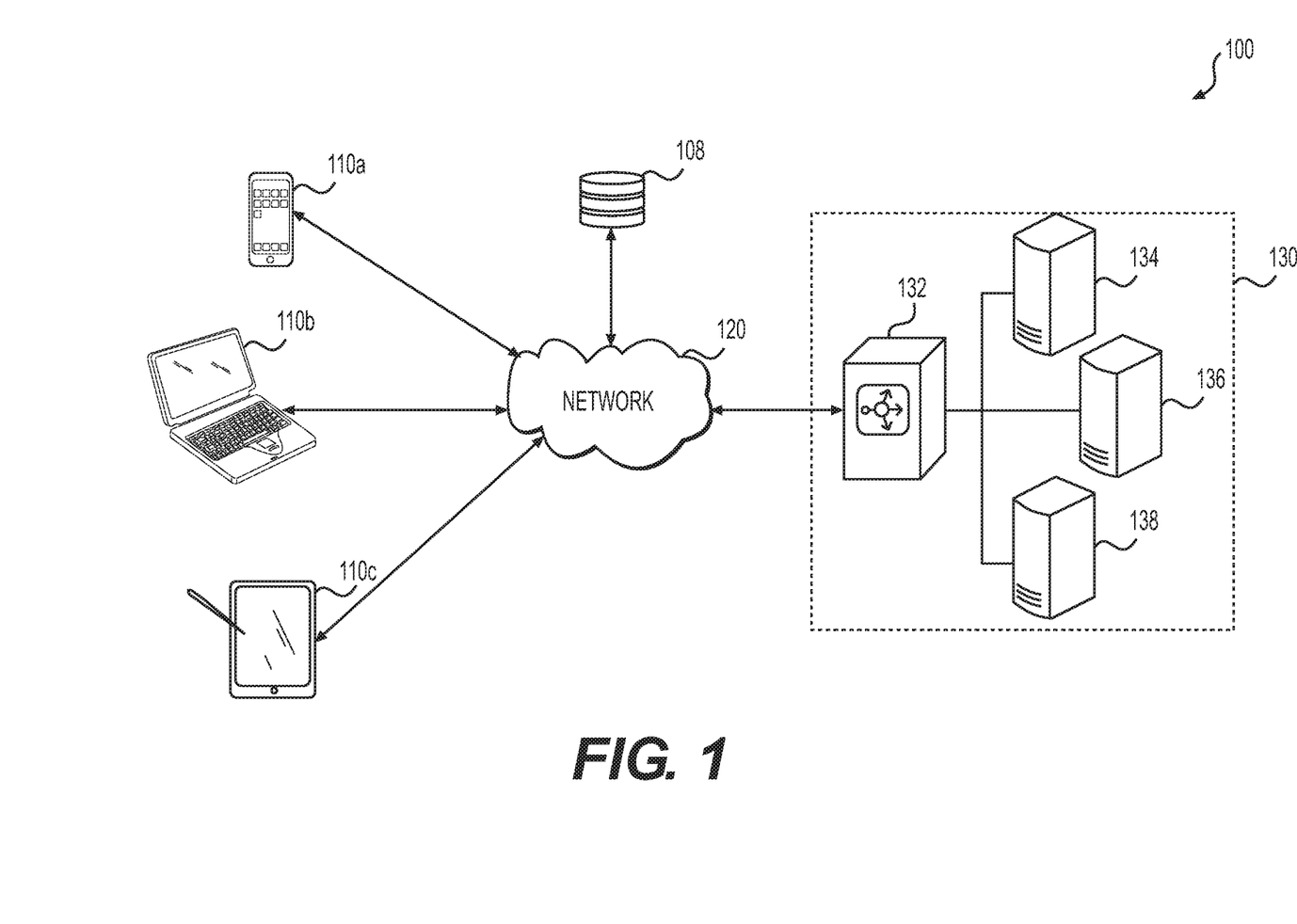
FIG. 1 is a schematic diagram of a system and environment in which devices may transmit data between each other over an electronic network, according to an exemplary embodiment of the present disclosure.

FIG. 1 is a block diagram of an exemplary distributed client-server system 100 suitable for practicing embodiments of the present disclosure. As shown in FIG. 1, system 100 includes client devices 110a, 110b, and 110c, each of which are communicatively coupled to a data center 130 via an electronic network 120. Network 120 may be any type of communication network or combination of networks used for exchanging electronic information between various computing devices. Network 120 may include, for example, a local area network, a medium area network, or a wide area network, such as the Internet. Additionally, network 120 may be a virtual network of virtual machines ("VMs") in a virtual system environment.

In the example shown in FIG. 1, client device 110a may be a mobile device, for example, a mobile handset, smartphone, personal digital assistant ("PDA"), or similar type of device; client device 110b may be a desktop and/or laptop computer; and client device 110c may be, for example, a tablet computer or similar type of mobile computing device having a touchscreen display. However, it should be noted that client devices 110a, 110b, and 110c are not intended to be limited to the types of computing devices depicted in FIG. 1 and that each of client devices 110a, 110b, and 110c may be implemented using any type of computing device configured to send and receive different types of electronic information to and from various computing devices via network 120. Such information may include, for example and without limitation, text, graphics, and multimedia content (including images, video, and/or audio files). Such content may be associated with, for example, a website that may be used to access the functionality of a web service through a web browser executable at each of client devices 110a, 110b, and 110c. Alternatively, such content may be loaded and displayed within a dedicated or standalone client application associated with the web service and executable at each of client devices 110a, 110b, and 110c.

Examples of different types of computing devices that may be used to implement any of client devices 110a, 110b, and 110c include, but are not limited to, a desktop computer or workstation, a laptop computer, a mobile handset, a PDA, a cellular telephone, a network appliance, a camera, a smart phone, an enhanced general packet radio service ("EGPRS") mobile phone, a media player, a navigation device, a game console, a set-top box, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

Also, as shown in the example of FIG. 1, data center 130 may be a distributed computing system including a load balancer 132 and "back-end" servers 134, 136, and 138. The load balancer 132 may be used to implement, for example, the source device, as discussed above. Similarly, back-end servers 134, 136, and 138 may be used to implement target devices. Load balancer 132 and servers 134, 136, and 138 may be communicatively coupled to one another via a private network behind a firewall (not shown). Such a private network may be associated with an enterprise or online service provider. The private network may be, for example, a medium area or wide area network, and each of load balancer 132 and servers 134, 136, and 138 may be in separate geographic locations. Further, data center 130 may include a plurality of load balancers and servers interconnected through a private network via network hardware.

Each of load balancer 132 and back-end servers 134, 136, and 138, also referred to as servers, may be implemented using any of various types of servers including, for example and without limitation, a web server or an application server. However, it should be noted that each of load balancer 132 and servers 134, 136, and 138 may be implemented using any general-purpose computer capable of serving data to other computing devices including, but not limited to, client devices 110a, 110b, 110c or any other computing device (not shown) via network 120. Such a general-purpose computer typically has at least one processor and memory for executing and storing instructions. The memory may include any type of random access memory ("RAM") or read-only memory ("ROM") embodied in a physical storage medium, such as magnetic storage including floppy disk, hard disk, or magnetic tape; semiconductor storage such as solid state disk ("SSD") or flash memory; optical disc storage; or magneto-optical disc storage. Software may include one or more applications and an operating system. Hardware may also include an output device, e.g., a display device coupled thereto, for displaying relevant information to a user and a user input device, e.g., a mouse, keyboard, or touchscreen display, for receiving input from the user.

In some embodiments, data center 130, including load balancer 132 and servers 134, 136, and 138, may be implemented as a clustered computing environment or server farm using multiple servers or general purpose computing devices having multiple processors and multiple shared or separate memory devices. While not shown in FIG. 1, data center 130 may also include one or more databases or data storage devices (not shown). Such data storage devices may be used to store any type of data or content accessible by the various computing devices of data center 130, including load balancer 132 and servers 134, 136, and 138.

Also, while only client devices 110a, 110b, and 110c are shown in FIG. 1, system 100 may include any number of client devices (e.g., each associated with one of many hundreds, thousands, or millions of users), all of which may be communicatively coupled via network 120. Likewise, while only load balancer 132 and servers 134, 136, and 138 are shown in FIG. 1, system 100 may include any number of load balancers and/or back-end servers, as desired for a particular implementation.

In an example, data center 130 may be used by an online service provider to host a web application or service via network 120. A user at each of client devices 110a, 110b, and 110c may access the functionality provided by the web service through a web browser or client application executable at each device. As will be described in further detail below, each of client devices 110a, 110b, and 110c may generate multiple requests to the web service hosted at data center 130 in response to user input at each client device. In one embodiment, the client devices 110a, 110b, and 110c may request an address for a web service (such as a blog, content server, chat server, mobile app server, etc.) operated by the data center 130. Consistent with typical domain name tracking and routing, a nearby domain name server ("DNS") server, e.g., DNS server 108 (which may also be a global server load balancer ("GSLB")) may return the virtual IP address for the web service executed at the load balancer 132. The client device 110a, 110b, and 110c may then send a connection request to the web service executed at data center 130. The requests may be received and processed by data center 130. Load balancer 132 may manage the workload of data center 130 by receiving incoming client requests from client devices 110a, 110b, and 110c via network 120 and distributing the incoming client requests to back-end servers 134, 136, and 138 the various tasks that need to be performed for processing each request. Additional features and characteristics of data center 130, including load balancer 132 and back-end servers 134, 136, and 138 will be described in further detail below with respect to FIG. 2.

Figure 2:
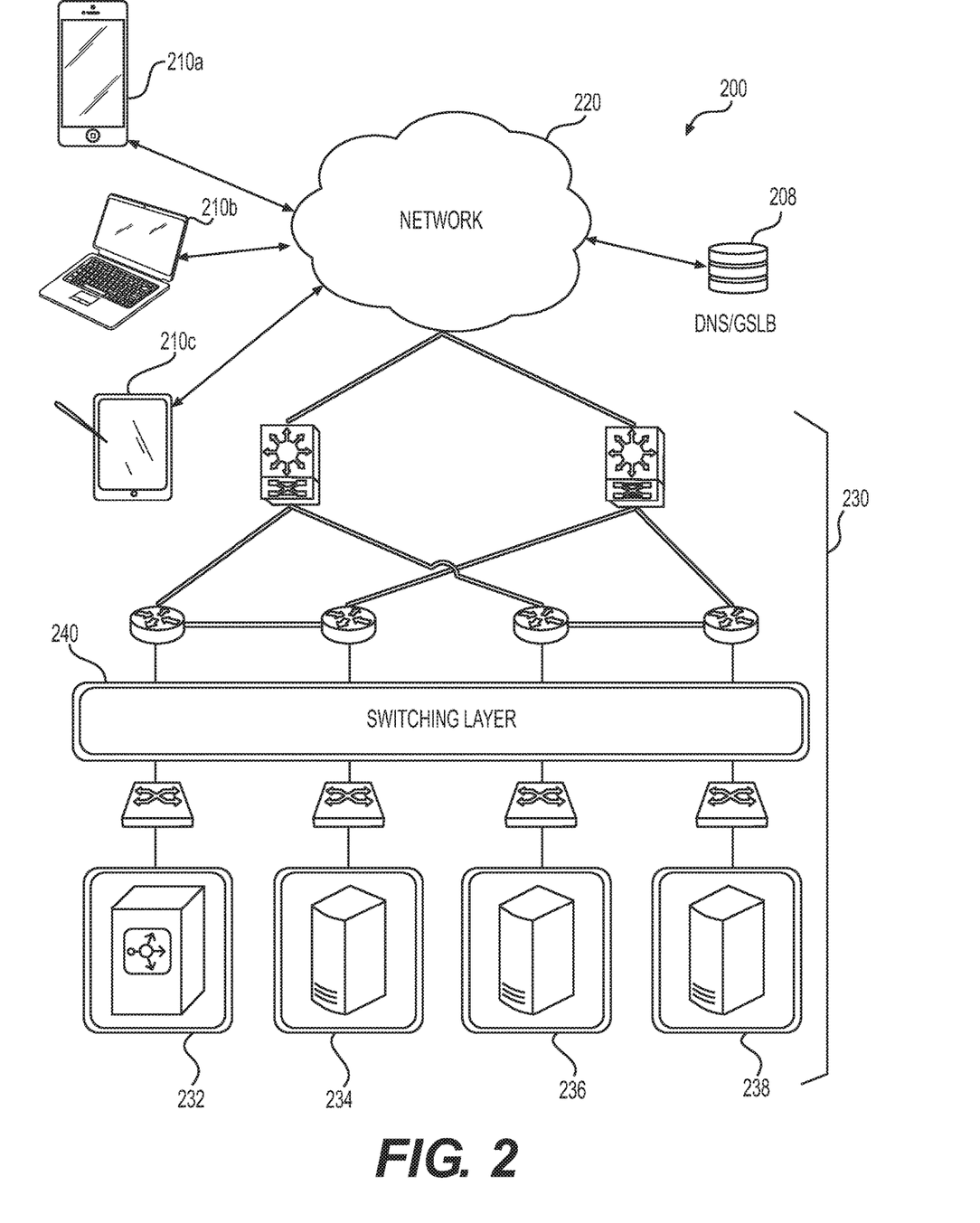
FIG. 2 is a schematic diagram of another exemplary system and environment in which devices may transmit data between each other over an electronic network using a switching layer, according to an exemplary embodiment of the present disclosure.

An exemplary distributed client-server system 200 may include any type of web server, service, or any other type of web resource that may be accessed by one or more of the client devices 210a, 210b, and 210c. In one embodiment, the data center 230 may include, for purposes of illustration, one or more Simple Object Access Protocol ("SOAP") servers, one or more Extensible Markup Language ("XML") servers, and/or one or more ("Representational State Transfer") REST servers. In one embodiment, data center 230 may be associated with an entity that operates any type or number of web-based services.

Any or all of the depicted devices and/or servers may be disposed in communication with a network 220, such as the Internet. Moreover, any pair of the devices and/or servers may be configured to exchange data packets over the network 220 according to any suitable predetermined protocol, such as hypertext transfer protocol ("HTTP") and transmission control protocol/Internet protocol ("TCP/IP"). Any or all of the devices and/or servers may be configured to perform various techniques for exchanging requests for data, responses to requests for data, and data, in manners so as to distribute network traffic among a plurality of load balancing servers. Connection requests from client devices may include data that corresponds to layers of the Open Systems Interconnect ("OSI") model developed by the International Organization for Standardization ("ISO"). IP addresses may be processed through various routers and/or switches and directed to a load balancing server, such as load balancer 232, which may operate on a domain boundary based on a destination virtual IP ("VIP") address.

Specifically, FIG. 2 depicts a proposed embodiment in which a client device, such as one of clients 210a, 210b, and 210c) may request the address for a web service (e.g., a blog, content site, streaming content, etc.) operating on data center 230. The request may be processed through various routers and/or switches and directed to a load balancing server 232 with a VIP address for the request. A DNS server, such as DNS server 208, may have provided the VIP address for the web service operating at data center 230. The data center 230 of FIG. 2 may also include a switching layer 240, which may be operating on any suitable type of server or router, and implementing any desired type of traffic director or software defined networking ("SDN") director consistent with the methods described below.

More specifically, by implementing the methods described below with respect to FIGS. 3, 4, and 5, system 200 may be configured to accept traffic bound for a single address, distribute that traffic to multiple servers, balance traffic between servers (e.g., limiting variance in load between servers), and rewrite layer 2 and/or layer 3 addresses as desired (e.g., to handle single network addressing or network address translation ("NAT") addressing from virtual to actual server IPs). In addition, by implementing the methods described below with respect to FIGS. 3, 4, and 5, system 200 may be configured to: allow a back-end server to be unaware of any intermediary devices; free back-end server resources; allow for larger configurations of virtual IPs and pools; allow load balancers to close connections to free load balancer resources; seamlessly change port numbers; and enable future implementation of IPv6.

Upon receiving a client request from a client device 210a, 210b, 210c for a web service at data center 230, a DNS server 208 may return the network address, e.g., the VIP address, for the web service operating on load balancer 232. The client request, which includes packets of data including a packet header, may then be transmitted to the web service residing at data center 230, which may be running on a plurality of back-end servers 234, 236, 238. An SDN traffic director associated with the exemplary switching layer 240, a virtual switching layer implemented in the back-end servers 234, 236, and 238, and/or a virtual and/or physical switching layer in between the load balancer 232 and back-end servers 234, 236, and 238, may control the flow of traffic, such as the client request, to and/or from the load balancer 232 and back-end servers 234, 236, and 238 by inspecting the packets of data of the client request. The SDN traffic director operating on the exemplary switching layer 240 may modify the packets of data of client requests and responses to the client requests in order to ensure that the client requests and responses are accurately directed. The SDN traffic director operating on the exemplary switching layer 240 may be controlled by an SDN controller operating on the exemplary switching layer 240. The load balancer 232 may use an application programming interface ("API") to transmit instructions to the SDN controller. In an alternative embodiment, the SDN control may operate on load balancer 232.

In one embodiment, switching layer 240 may be one or more network devices, such as a server, a switch, a router, a virtual switch running on a server, etc. Switching layer 240 may receive TCP/IP traffic and/or any network protocol, including, but not limited to, UDP or ICMP, traffic (e.g., client requests) from numerous client devices (e.g., client devices 210a, 210b, 210c) destined for a predetermined network address (e.g., IP address). As described above with respect to FIG. 2, the traffic may be received in relation to one or more web services, such as a blog, a content site, a streaming content site, a multimedia site, a web application, a mobile application, or any other web service that implements HTML and/or TCP/IP. As described above, especially in cases of heavy network traffic, such as involving interaction with hundreds of thousands or millions of client devices, it may be desirable to distribute network traffic between several network servers, such as between back-end servers 234, 236, 238, depicted in FIG. 2.

The load balancer 232 may be configured with a list of destination IP addresses of back-end servers, also referred to as servers, 234, 236, 238, etc., which may be private and internal addresses of physical servers. This list of destination IP addresses may define the pool of back-end servers that can handle the client requests sent to that VIP of the load balancer, and the load balancer 232 may distribute the connection requests across the pool of servers. For systems with a large number of back-end servers, the load balancer 232 may need to distribute the connection requests to servers across a layer 3 boundary.

In order to address servers across the layer 3 boundary, extra bits or reserve portions of packet data may be used by load balancer 232. For example, IP packets that conform to an IPv4 have Differentiated Service Code Point ("DSCP") bits (reserve portion) in the IPv4 header that may be used to increase the addressable back-end servers by a load balancer. Of course, other bits in the IPv4 header, as well as other IP versions, such as IPv6, may be used. However, use of such bits in IPv4 headers or other IP versions that are reserved for predefined functions may preclude the use of the function's default implementation. Further, use of bits in IPv4 headers or other IP versions for other than their default function may involve both load balancers and back-end servers to be configured to acknowledge the bits' non-standard use. In an alternative embodiment, the load balancer 232 may transmit to the switching later 240 via a protocol having type length value ("TLV") packets that include fields in the packet header, such as a source IP address, destination IP address, source port, destination port, and a protocol, e.g., TCP. The packets may also include a reserve portion having the VIP Address and backend server port, if needed.

In order to alleviate the workload involved in using the extra bits (reserve portion) on load balancers and back-end servers, switching layers, such as switch layer 240, may be setup to implement and recognize non-standard use of bits in the packet headers of client requests. In the exemplary embodiment below, increasing the addressable back-end servers may be implemented through the use of DSCP bits of an IPv4 header, but it should be noted that such an embodiment is non-limiting. Other types of bits and network protocols may be used.

Figure 3:
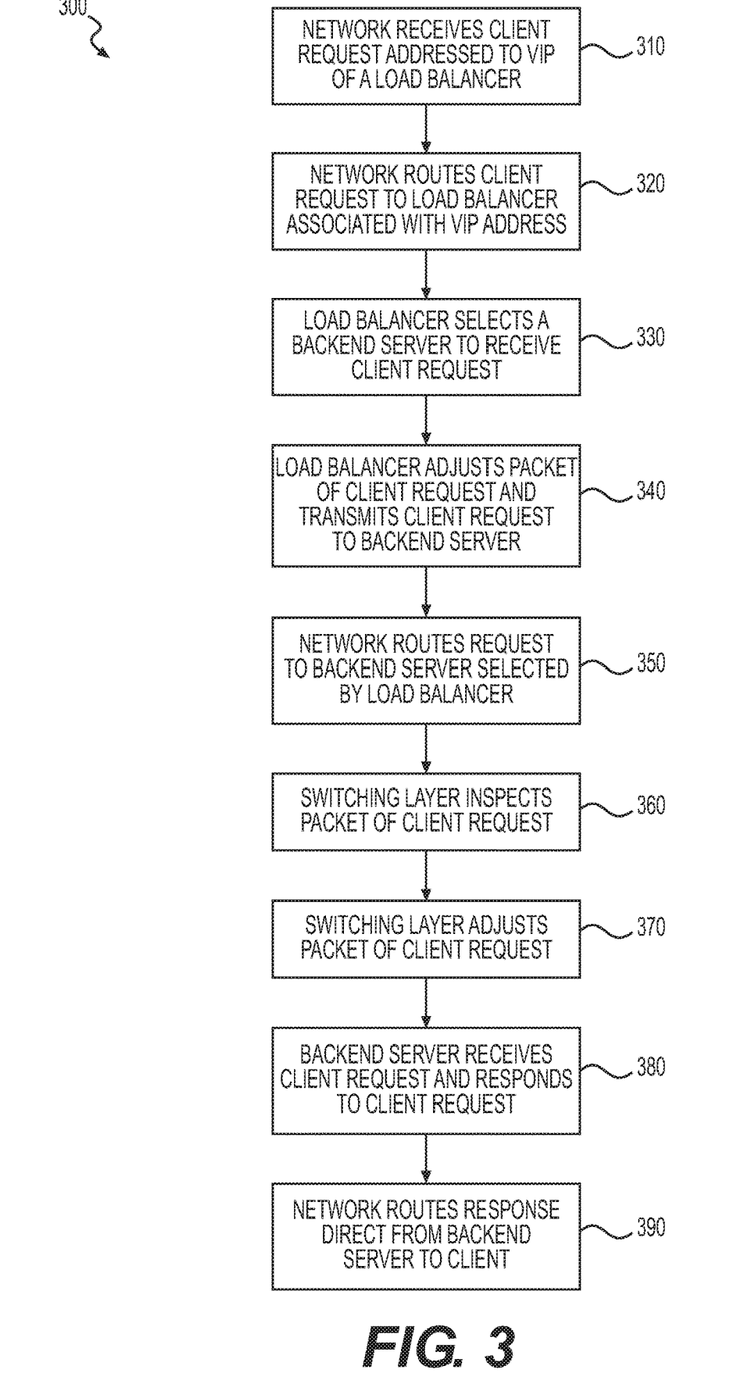
FIG. 3 is a flow diagram of an exemplary method by which devices may transmit data requests and data between each other over an electronic network, according to an exemplary embodiment of the present disclosure.

FIG. 3 is an example method 300 of load balancing using direct server return, according to one embodiment of the present disclosure. At step 310, the network of a data center, such as data center 230 of FIG. 2, may receive a client request addressed to a VIP of a load balancer in the network. The client request may include a packet header having a source IP that identifies an IP address of the client device making the client request and having a destination IP that identifies the VIP of the load balancer, such as load balance 232. Once the request is received, at step 320 the network may route the client request to the load balancer associated with the VIP. The method may then proceed to step 330 where the load balancer may select which back-end server is to receive the client request.

After determining the back-end server to receive the client request, at step 340 the load balancer may modify the packet header of the client request and transmits the client request to the back-end server. For example, the destination IP of the packet header of the client request may be modified to the IP address of the back-end server selected. Additionally, the load balancer may modify other parts (bits) of the packet header, such as DSCP bits, to indicate the VIP of the load balancer that is transmitting the client request to the back-end server via the network.

At step 350, the network may route the client request to the back-end server selected by the load balancer. Then, at step 360, a switching layer at or near the back-end server, such as switching layer 240, may inspect the packet of the client request. At step 370, the switching layer may modify the packet header of the client request prior to receipt of the back-end server. For example, the destination IP of the packet header of the client request may be modified to the VIP of the load balancer based on the modifications to bits of the packet header by the load balancer. In an alternative embodiment, a switching layer, such as switching layer 240, may inspect and modify the packet header of the client request before the network routes the client request to the back-end server selected by the load balancer.

At step 380, the back-end server may then receive the client request and respond to the client request. In response to the client request, the packet header of the response may include a source IP that identifies the VIP of the load balancer and having a destination IP that identifies the IP address of the client that made the client request. Then, at step 390, the network may route the response from the back-end server to the IP address of the client. Additionally, and/or alternatively, the switching layer, at step 390, may modify the source IP address of the packet to an IP that identifies the VIP of the load balancer when not performed by the back-end server.

In an alternative embodiment, the switching layer may not modify the packet header of the client request prior to receipt of the back-end server. The target device may respond to the client request with its own IP address as the source IP and the VIP address of the load balancer as destination IP. The switching layer may then modify the response of the target device. For example, the source IP of the packet header of the response may be modified to the VIP of the load balancer and the destination IP of the packet header of the response may be modified to the IP of the client device based on the modifications to bits of the packet header by the load balancer.

Figure 4:
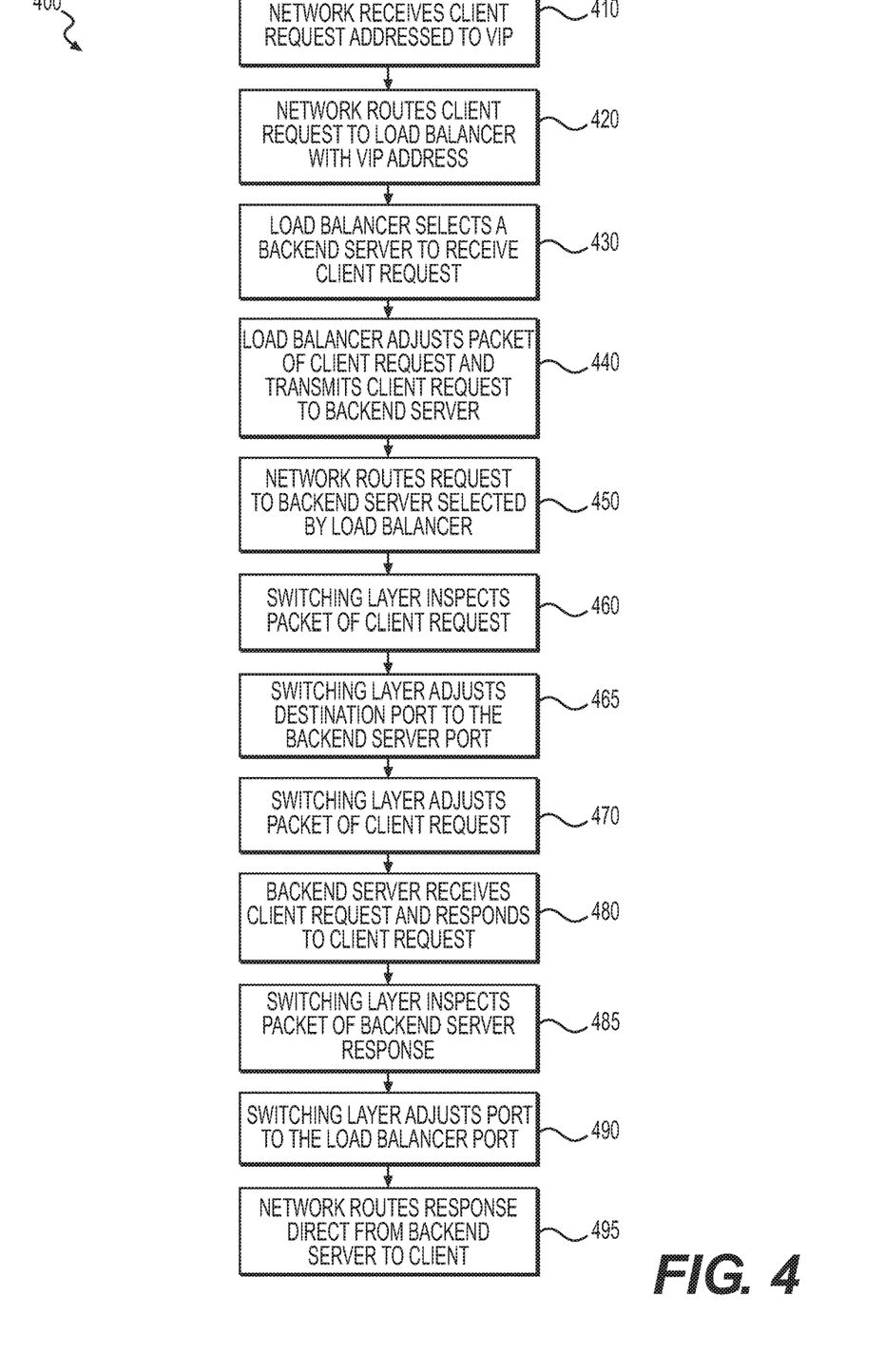
FIG. 4 is a flow diagram of another exemplary method by which devices may transmit data requests and data between each other over an electronic network, according to an exemplary embodiment of the present disclosure.

FIG. 4 is an example method 400 of load balancing using direct server return and port translation, according to one embodiment of the present disclosure. At step 410, the network of a data center, such as data center 230 of FIG. 2, may receive a client request addressed to a VIP of a load balancer in the network. The client request may include a packet header having a source IP that identifies an IP address of the client device making the client request and having a destination IP that identifies the VIP of the load balancer, such as load balancer 232. The client request may also include a destination port number that identifies the VIP port used by the load balancer. Once the request is received, at step 420 the network may route the client request to the load balancer associated with the VIP. The method may then proceed to step 430, where the load balancer may select which back-end server is to receive the client request.

After determining the back-end server to receive the client request, at step 440 the load balancer may modify the packet header of the client request and transmit the client request to the back-end server. For example, the destination IP of the packet header of the client request may be modified to the IP address of the back-end server selected. Additionally, the load balancer may modify other parts (bits) and/or reserve portions of the packet header, such as DSCP bits, to indicate the VIP of the load balancer that is transmitting the client request to the back-end server via the network. The destination port number that identifies the VIP port used by the load balancer may remain unchanged.

At step 450, the network may route the client request to the back-end server selected by the load balancer. Then, at step 460, a switching layer at or near the back-end server, such as switching layer 240, may inspect the packet of the client request. At step 465, the switching layer may modify the destination port number to a port of the back-end server. For example, the switching layer may use a flow table to map and remap port numbers. In one embodiment, the switching layer may be configured to receive a flow table that includes port numbers used by back-end servers and port numbers used by load balancers. When the switching layer receives a client request destined for a back-end server, the switching layer may modify the port number used by the load balancer to a port number that the back-end server uses.

At step 470, the switching layer may modify the packet header of the client request prior to receipt of the back-end server. For example, the destination IP of the packet header of the client request may be modified to the VIP of the load balancer based on the modifications to bits of the packet header by the load balancer. In an alternative embodiment, a switching layer, such as switching layer 240, may inspect and modify the port and/or packet header of the client request before the network routes the client request to the back-end server selected by the load balancer.

At step 480, the back-end server may then receive the client request and respond to the client request. In response to the client request, the packet header of the response may include a source IP that identifies the VIP of the load balancer and that has a destination IP that identifies the IP address of the client that made the client request. The destination port number may remain the port number of the back-end server.

Then, at step 485, the switching layer at or near the back-end server may inspect the packet of the response to the client request from the back-end server. At step 490, the switching layer may modify the port number to a port of the load balancer to which the client initial sent the request. For example, the switching layer may use the flow table to map and remap port numbers. Additionally, and/or alternatively, the switching layer, at step 490, may modify the source IP address of the packet to an IP that identifies the VIP of the load balancer when not performed by the back-end server. Then, at step 495, the network may route the response from the back-end server to the IP address of the client without traversing the load balancer.

Figure 5:
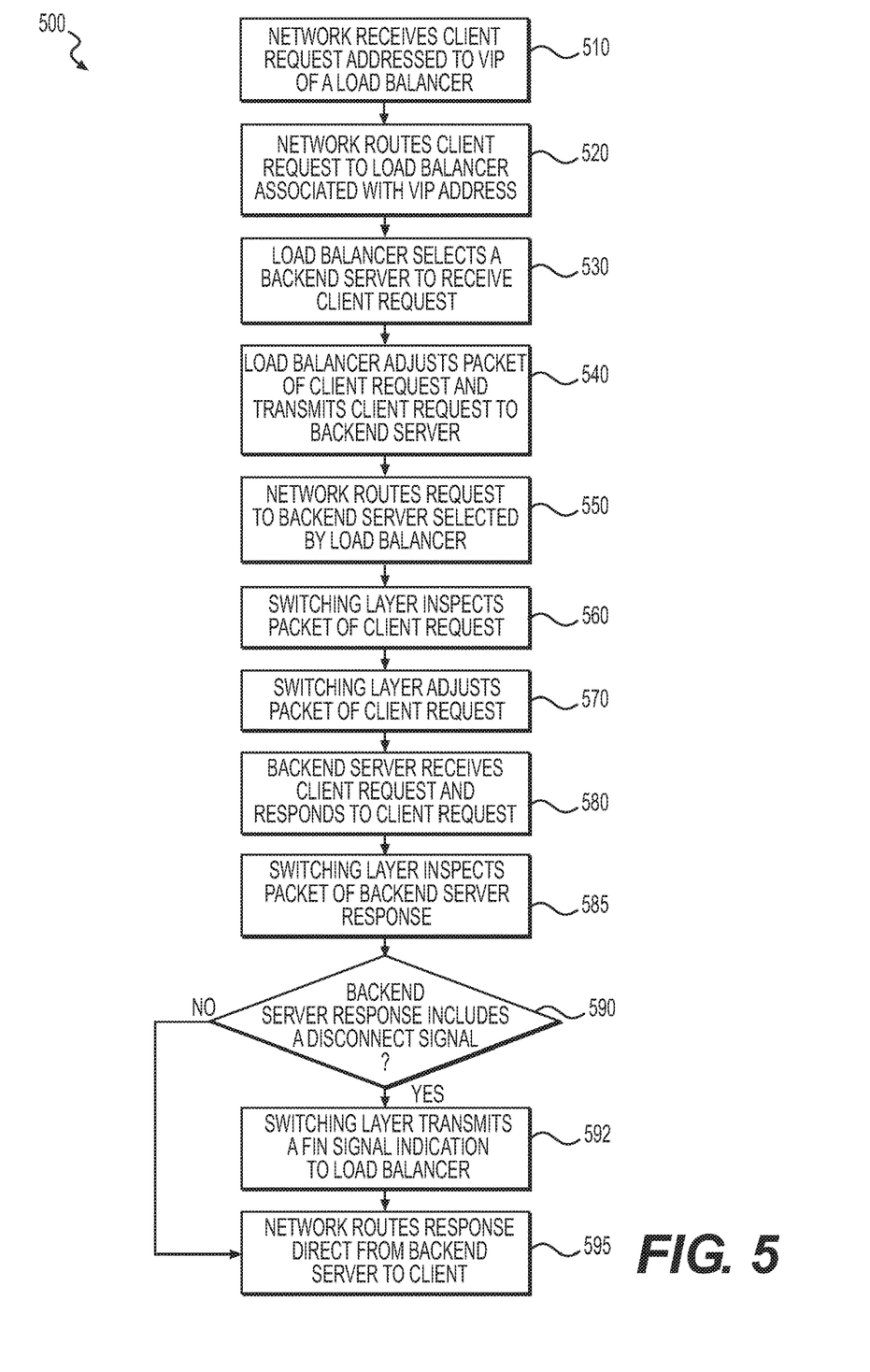
FIG. 5 is a flow diagram of yet another exemplary method by which devices may transmit data requests and data between each other over an electronic network, according to an exemplary embodiment of the present disclosure.

FIG. 5 is an example method 500 of load balancing using direct server return that includes closed connection detection, according to one embodiment of the present disclosure. At step 510, the network of a data center, such as data center 230 of FIG. 2, may receive a client request addressed to a VIP of a load balancer in the network. The client request may include a packet header having a source IP that identifies an IP address of the client device making the client request and having a destination IP that identifies the VIP of the load balancer, such as load balancer 232. Once the request is received, the network may route the client request to the load balancer associated with the VIP at step 520. The method then proceeds to step 530 where the load balancer selects which back-end server is to receive the client request.

After determining the back-end server to receive the client request, the load balancer may modify the packet of the client request and transmit the client request to the back-end server at step 540. For example, the destination IP of the packet header of the client request may be modified to the IP address of the back-end server selected. Additionally, the load balancer may modify other parts (bits) of the packet header, such as DSCP bits, to indicate the VIP of the load balancer that is transmitting the client request to the back-end server via the network.

At step 550, the network may route the client request to the back-end server selected by the load balancer. Then, at step 560, a switching layer at or near the back-end server, such as switching layer 240, may inspect the packet of the client request. At step 570, the switching layer may modify the packet of the client request prior to receipt of the back-end server. For example, the destination IP of the packet header of the client request may be modified to the VIP of the load balancer based on the modifications to bits of the packet header by the load balancer. In an alternative embodiment, a switching layer, such as switching layer 240, may inspect and modify the packet of the client request before the network routes the client request to the back-end server selected by the load balancer.

At step 580, the back-end server may then receive the client request and respond to the client request. In response to the client request, the packet header of the response may include a source IP that identifies the VIP of the load balancer and that has a destination IP that identifies the IP address of the client that made the client request.

Then, at step 585, the switching layer at or near the back-end server may inspect the packet of the response to the client request from the back-end server. At step 590, the switching layer may determine if the back-end server response includes a close connection indication. For example, the response may include a disconnect signal (also referred to as a FIN signal) that is meant to close the connection to the client device. Since the response is not transmitted via the load balancer, the load balancer may not be aware of when the connection may be closed. Thus, if the back-end server response includes a close connection (disconnect signal) indication, at step 592 the switch layer may transmit a disconnect signal indication to the load balancer associated with the source IP of the response. If the back-end server response does not include a close connection indication, the method 500 may proceed to step 595. Then, at step 595, the network may route the response from the back-end server to the IP address of the client. The switching layer, at step 595, may also modify the source IP address of the packet to an IP that identifies the VIP of the load balancer when not performed by the back-end server.

Any of client devices 110a, 110b, 110c, 210a, 210b, and 210c, load balancers 132 and 232, components of data centers 130 and 230, servers 134, 136, 138, 234, 236, and 238, and/or switching layer 240 may include any type or combination of computing systems, such as handheld devices, personal computers, servers, clustered computing machines, and/or cloud computing systems. In one embodiment, client devices 110a, 110b, 110c, 210a, 210b, and 210c, load balancers 132 and 232, components of data centers 130 and 230, servers 134, 136, 138, 234, 236, and 238, and/or switching layer 240 may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Figure 6:
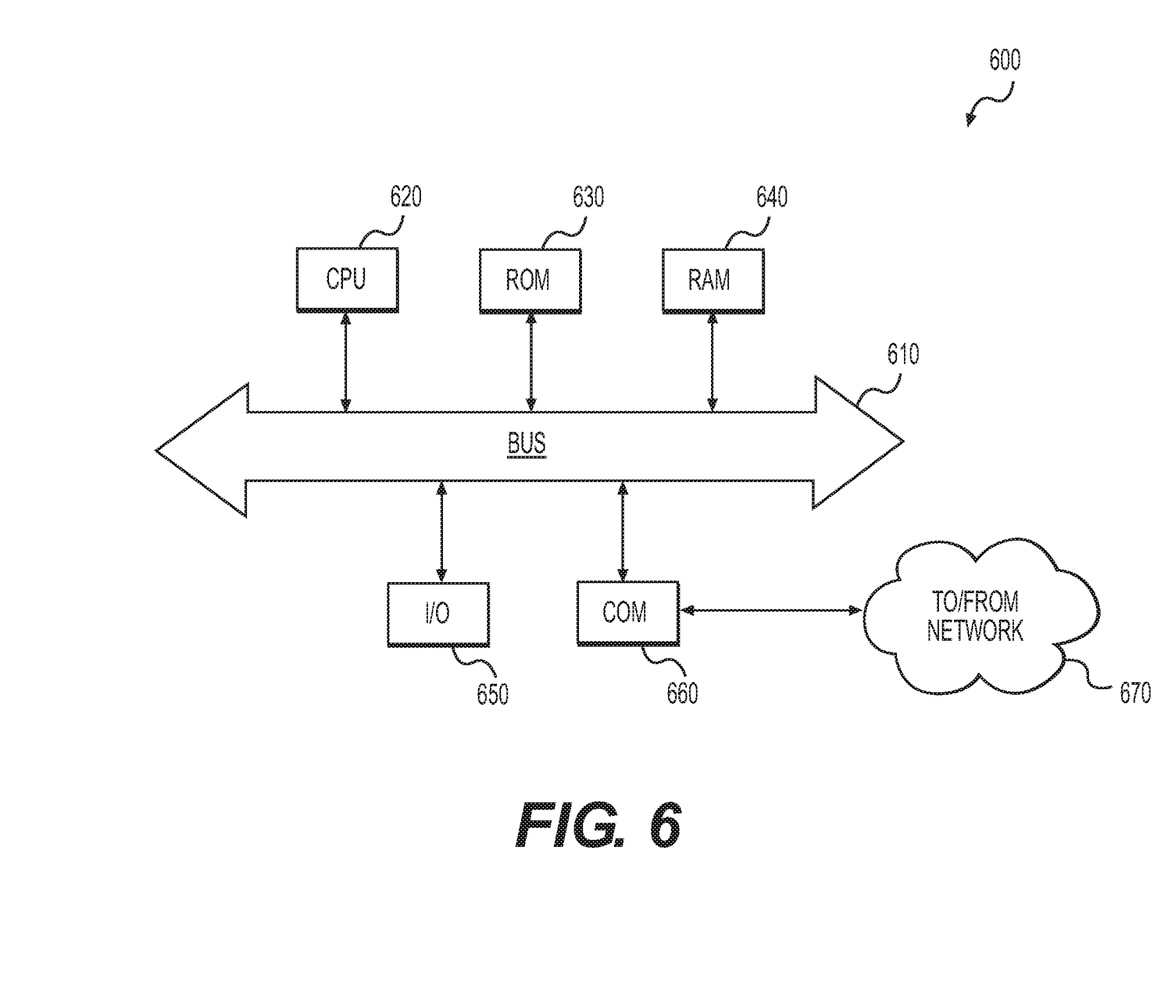
FIG. 6 is a simplified functional block diagram of a computer that may be configured as a device or server for executing the methods of FIGS. 3-5, according to exemplary embodiments of the present disclosure.

FIG. 6 is a simplified functional block diagram of a computer that may be configured as a device or server for executing the methods of FIGS. 3-5, according to exemplary embodiments of the present disclosure. Specifically, in one embodiment, as shown in FIG. 6, any of client devices 110a, 110b, 110c, 210a, 210b, and 210c, load balancers 132 and 232, components of data centers 130 and 230, servers 134, 136, 138, 234, 236, and 238, and/or switching layer 240 may be an assembly of hardware 600 including, for example, a data communication interface 660 for packet data communication. The platform may also include a central processing unit ("CPU") 620, in the form of one or more processors, for executing program instructions. The platform typically includes an internal communication bus 610, program storage, and data storage for various data files to be processed and/or communicated by the platform such as ROM 630 and RAM 640, although the system 600 often receives programming and data via network communications 670. The server 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for directly responding to client requests received from a plurality of client devices, the method including:
  receiving, at a source device, a client request from a client device of the plurality of client devices, wherein the client request includes a packet having a reserve portion, a source portion set to an address of the client device, and a destination portion set to include each of a virtual IP ("VIP") address and a VIP port of the source device;
  determining, by the source device, a target device from a plurality of target devices to respond to the client request;
  modifying, by the source device, the destination portion of the packet from the VIP address of the source device to an address of the determined target device, and modifying, by the source device, the source portion to indicate the VIP address of the source device;
  transmitting, by the source device, the modified client request to the determined target device;
  prior to the determined target device receiving the modified client request, inspecting, by a switching layer, the packet of the client request;
  based on the inspection, modifying by the switching layer, the VIP port in the destination portion of the packet to a port of the determined target device; and
  responding, by the determined target device, to the client request by sending a response directly from the determined target device to the client device without traversing the source device.

2. The method of claim 1, wherein the source device is a load balancer and the target device is a server.

3. The method of claim 1, further comprising:
  modifying, by the switching layer, the port of the determined target device in the response to the VIP port of the source device based on a predetermined table,
  wherein the port of the determined target device is different from the VIP port of the source device.

4. The method of claim 1, further comprising:
  determining, by the switching layer, whether the response includes a close connection indication; and
  transmitting, by the switching layer, any determined close connection indication to the source device for a response determined to include the close connection indication.

5. The method of claim 1, wherein Internet Protocol defines a format of the client request and the response.

6. The method of claim 1, wherein the reserve portion includes Differentiated Service Code Point ("DCSP") bits, and wherein the DSCP bits comprise an IPv4 packet header of the packet.

7. The method of claim 1, wherein the source device transmits the modified client request via a protocol having type length (TLV) packets.

8. A system for directly responding to client requests received from a plurality of client devices, the system including:
  a data storage device that stores instructions for directly responding to client requests received from a plurality of client devices; and
  a processor configured to execute the instructions to perform a method including:
    receiving, at a source device, a client request from a client device of the plurality of client devices, wherein the client request includes a packet having a reserve portion, a source portion set to an address of the client device, and a destination portion set to include each of a virtual IP ("VIP") address and a VIP port of the source device;
    determining, by the source device, a target device from a plurality of target devices to respond to the client request;
    modifying, by the source device, the destination portion of the packet from the VIP address of the source device to an address of the determined target device, and modifying, by the source device, the source portion to indicate the VIP address of the source device;
    transmitting, by the source device, the modified client request to the determined target device;
    prior to the determined target device receiving the modified client request, inspecting, by a switching layer, the packet of the client request;
    based on the inspection, modifying by the switching layer, the VIP port in the destination portion of the packet to a port of the determined target device; and
    responding, by the determined target device, to the client request by sending a response directly from the determined target device to the client device, without traversing the source device.

9. The system of claim 8, wherein the source device is a load balancer and the target device is a server.

10. The system of claim 8, wherein the processor is further configured to execute the instructions to perform the method including:
  modifying, by the switching layer, the port of the determined target device in the response to the VIP port of the source device based on a predetermined table,
  wherein the port of the determined target device is different from the VIP port of the source device.

11. The system of claim 8, wherein the processor is further configured to execute the instructions to perform the method including:
  determining, by the switching layer, whether the response includes a close connection indication; and
  transmitting, by the switching layer, any determined close connection indication to the source device for a response determined to include the close connection indication.

12. The system of claim 8, wherein Internet Protocol defines a format of the client request and the response.

13. The system of claim 8, wherein the reserve portion includes Differentiated Service Code Point ("DCSP") bits, and wherein the DSCP bits comprise an IPv4 packet header of the packet.

14. The system of claim 8, wherein the source device transmits the modified client request via a protocol having type length (TLV) packets.

15. A non-transitory computer-readable medium storing instructions that, when executed by a computer, cause the computer to perform a method of directly responding to client requests received from a plurality of client devices, the method including:
  receiving, at a source device, a client request from a client device of the plurality of client devices, wherein the client request includes a packet having a reserve portion, a source portion set to an address of the client device, and a destination portion set to include each of a virtual IP ("VIP") address and a VIP port of the source device;
  determining, by the source device, a target device from a plurality of target devices to respond to the client request;
  modifying, by the source device, the destination portion of the packet from the VIP address of the source device to an address of the determined target device, and modifying, by the source device, the source portion to indicate the VIP address of the source device;
  transmitting, by the source device, the modified client request to the determined target device;
  prior to the determined target device receiving the modified client request, inspecting, by a switching layer, the packet of the client request;
  based on the inspection, modifying by the switching layer, the VIP port in the destination portion of the packet to a port of the determined target device; and
  responding, by the determined target device, to the client request by sending a response directly from the determined target device to the client device without traversing the source device.

16. The computer-readable medium of claim 15, wherein the source device is a load balancer and the target device is a server.

17. The computer-readable medium of claim 15, further comprising:
  modifying, by the switching layer, the port of the determined target device in the response to the VIP port of the source device based on a predetermined table,
  wherein the port of the determined target device is different from the VIP port of the source device.

18. The computer-readable medium of claim 15, further comprising:
  determining, by the switching layer, whether the response includes a close connection indication; and
  transmitting, by the switching layer, any determined close connection indication to the source device for a response determined to include the close connection indication.

19. The computer-readable medium of claim 15, wherein the reserve portion includes Differentiated Service Code Point ("DCSP") bits, and wherein the DSCP bits comprise an IPv4 packet header of the packet.

20. The computer-readable medium of claim 15, wherein the source device transmits the modified client request via a protocol having type length (TLV) packets.

* * * * *